United States Patent

[11] 3,631,597

[72] Inventors Nathaniel H. Lieb
Philadelphia;
Franklin W. Kerfoot, Jr., Newtown Square, both of Pa.
[21] Appl. No. 858,064
[22] Filed Sept. 15, 1969
[45] Patented Jan. 4, 1972
[73] Assignee Star Dental Manufacturing Co., Inc.
Philadelphia, Pa.

[54] HANDPIECE WITH IMPROVED CHUCK ASSEMBLY
24 Claims, 13 Drawing Figs.

[52] U.S. Cl. ................................................ 32/26
[51] Int. Cl. ................................................ A61c 1/08
[50] Field of Search ........................................ 279/51, 46; 32/26, 27

[56] References Cited
UNITED STATES PATENTS
1,741,734  12/1929  Pannwitz ..................... 32/26 X

| | | | |
|---|---|---|---|
| 2,432,179 | 12/1947 | Staunt .......................... | 32/26 |
| 2,735,687 | 12/1956 | Cox .............................. | 279/51 |
| 3,043,614 | 7/1962 | Eichmann ..................... | 279/46 |
| 3,400,459 | 9/1968 | Stemler ........................ | 22/26 |
| 3,530,586 | 9/1970 | Weickgennut ............... | 32/26 |

Primary Examiner—Robert Peshock
Attorney—Caesar, Rivise, Bernstein & Cohen

ABSTRACT: A dental handpiece having a rear housing containing a power assembly and a front housing containing a chuck assembly. The front housing is provided with an assembly for quickly connecting and removing the same from the rear housing. Additionally, a novel mechanism is provided for securing a bur in the chuck assembly. The mechanism includes a rotatable sleeve having a pair of balls secured in grooves therein. Rotation of the sleeve moves the balls in grooves of a linearly moving connector which in turn moves the collet of the chuck assembly linearly. Thus, rotational motion is translated into linear motion to advance and retract the collet securing the shank of the dental bur.

PATENTED JAN 4 1972

INVENTORS.
NATHANIEL H. LIEB
FRANKLIN W. KERFOOT, JR.
BY
Caesar, Rivise,
Bernstein & Cohen
ATTORNEYS.

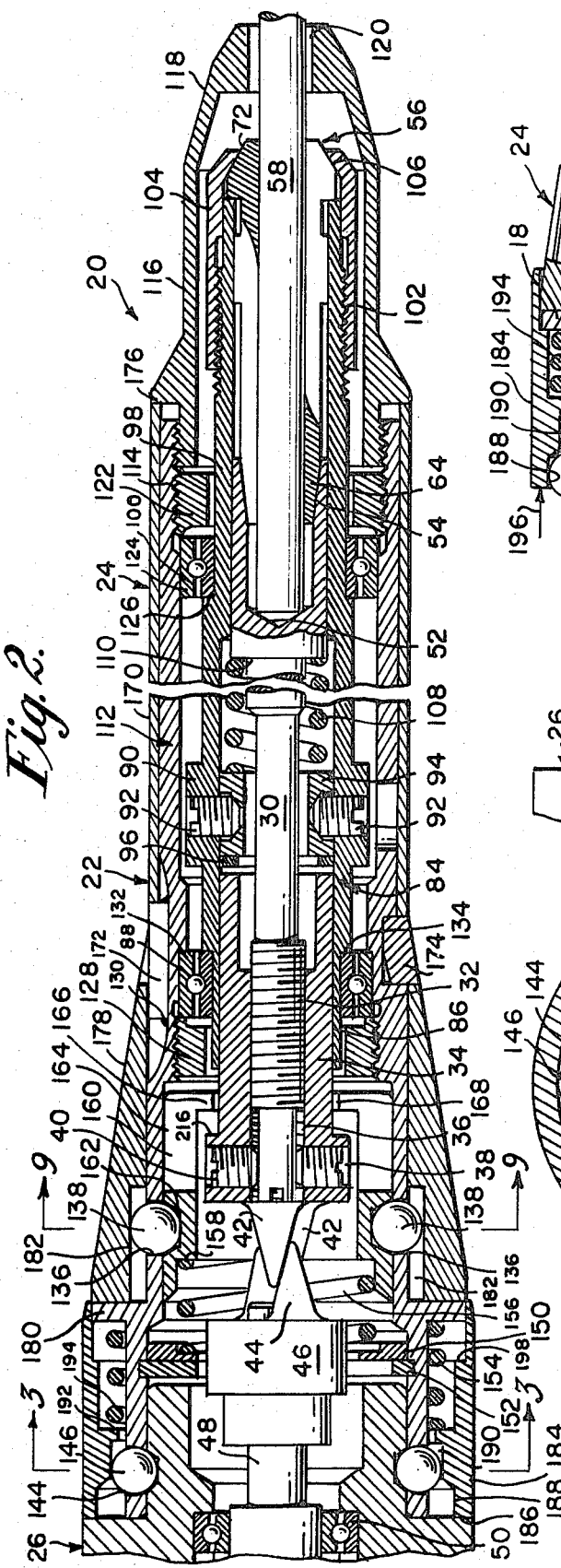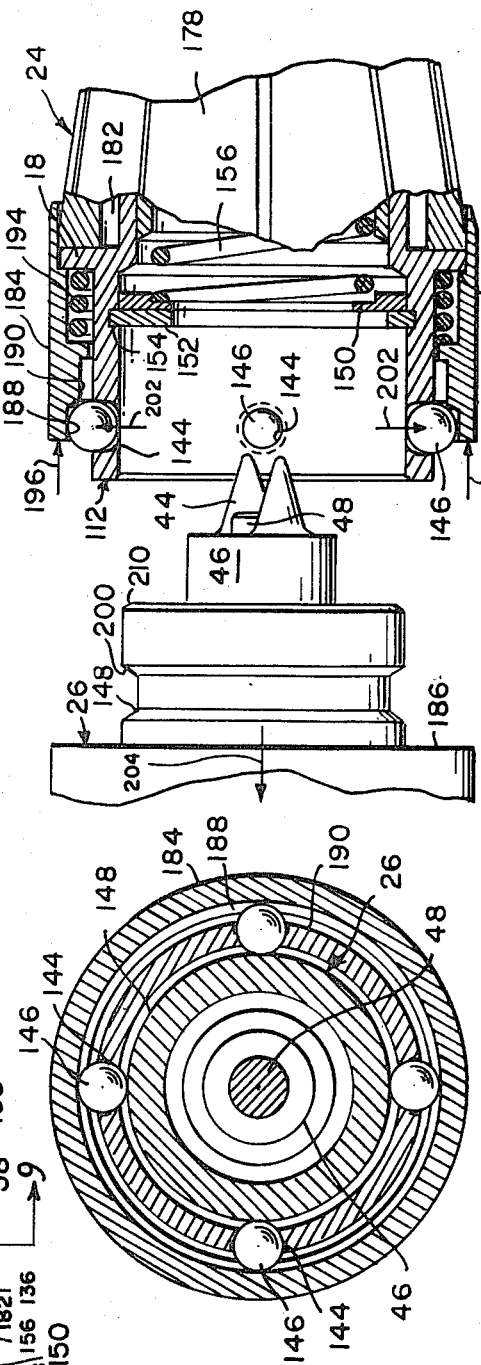

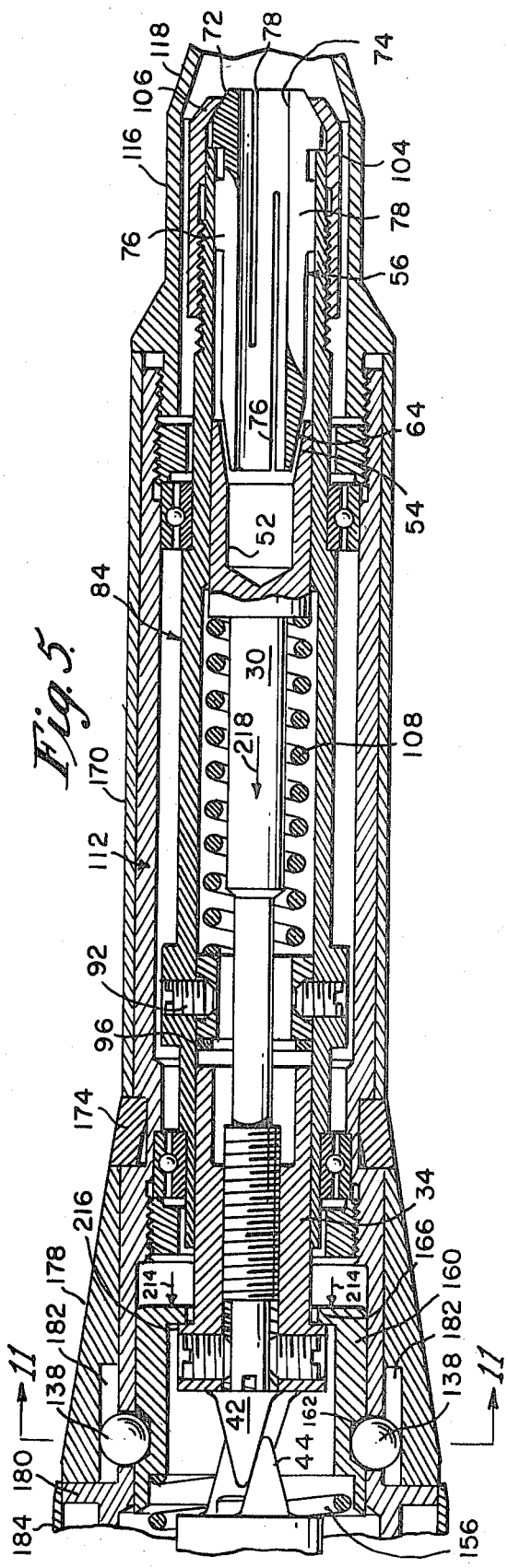

HANDPIECE WITH IMPROVED CHUCK ASSEMBLY

This invention relates to a dental handpiece, and more particularly, to a quick-disconnect assembly for a dental handpiece and a novel chuck assembly for a dental handpiece.

In U.S. Pat. No. 3,349,490, there is disclosed a novel air-driven straight dental handpiece. The dental bur is held within the handpiece by a spring-loaded collet. However, the collet can only be controlled by a projecting ring, which could interfere with the use of the handpiece. Furthermore, the collet had only one set of jaws, and would thus grasp a dental bur at only one position on the shank.

An improved collet assembly for use on the handpiece of U.S. Pat. No. 3,349,490 is disclosed and claimed in copending U.S. application Ser. No. 533,087, filed Mar. 9, 1966, now U.S. Pat. No. 3,488,850. The improved collet assembly of application Ser. No. 533,087 results in greater concentricity for the rotating bur, less noise during use and a more positive lock or hold on the bur. The chuck assembly of the handpiece of this invention enjoys all of the advantages of the chuck assembly disclosed in application Ser. No. 533,087, and in addition, possesses numerous advantages over the chuck assembly of the copending application. One of these advantages is that the collet moves toward the front of the handpiece as it is tightened. This renders the collet particularly adaptable for use with a contraangle attachment on a straight handpiece. Thus, where the collet moves rearwardly as it is tightened, it would tend to pull the drive shaft on the contraangle attachment, which could result in a binding of the gears of the contraangle attachment during use. This will not occur using the chuck assembly of this invention.

Another advantage of the chuck assembly of this invention is that there are only two positions for the control sleeve. Thus, the control sleeve can be moved from a first position wherein the collet is open to a second position wherein the collet is closed. The positioning of the collet can be preset for the diameter of the shank of the dental bur, and the bur will always be provided with the same gripping force whenever the collet is in its closed position. In the prior art chuck assemblies, the dentist would tighten the collet until he believed the bur was securely held in place or loosen the collet until he thought the bur could be removed. When doing this, there was always the possibility that the bur would not be held sufficiently tightly to prevent its inadvertent removal when the dentist is using the handpiece. This cannot occur with the handpiece of this invention, since the dentist will always know that when the control sleeve is in the position for locking the dental bur in place, the dental bur will always be held securely in place. Likewise, there is no lost motion in removing the bur.

In another aspect of this invention, a mechanism is provided for quickly connecting and disconnecting the front or chuck housing from the motor housing of the handpiece. The purpose of having the quick-disconnect arrangement is to permit the dentist to change from a straight chuck on the front of the handpiece to a contraangle chuck or to service the chuck housing. Quick-disconnect arrangements have been used in the prior art for dental handpieces. One of the most commonly used is a bayonet type, wherein a pin on the chuck housing is inserted in a slot on the motor housing, and the chuck housing is then rotated to lock the pin in the slot. When this is done, the chuck housing is rigidly held in place, and cannot be rotated. Utilizing the quick-disconnect assembly of this invention, the chuck housing can still be rotated after the chuck housing has been connected to the motor housing. Having the rotatable chuck housing gives a dentist a greater freedom of movement when operating on a patient than could be attained if the chuck housing were fixedly mounted on the motor housing.

It is therefore an object of this invention to provide a novel dental handpiece.

It is another object of this invention to provide a dental handpiece having an improved chuck assembly.

It is a further object of this invention to provide a quick-disconnect assembly for connecting the chuck housing to the motor housing on a dental handpiece.

These and other objects of this invention are accomplished by providing a dental handpiece comprising a housing, said housing including drive means, a rotatable spindle connected to said drive means, said spindle having a tapering wall at one end thereof, a collet mounted within said spindle, said collet having a plurality of jaws therein, said jaws being tapered at one end thereof with the taper of said jaws complementing the taper of the end of said spindle, whereby abutment of said tapered surfaces of said jaws and said spindle will depress said jaws, and means for moving said collet into abutment with said tapered wall, said means comprising rotatable means on said housing, said rotatable means actuating linear means which is adapted to move said collet out of abutment with said tapering wall.

Other objects and many of the attendant advantages of this invention will be readily appreciated as the same becomes better understood by reference to the following detailed description when considered in connection with the accompanying drawings wherein:

FIG. 2 is an enlarged sectional view, with parts broken away, taken along the line 2—2 of FIG. 1;

FIG. 3 is a sectional view taken along the line 3—3 of FIG. 2;

FIG. 4 is a fragmentary exploded side elevational view, partly in section, showing the quick-disconnect mechanism of the handpiece of this invention;

FIG. 5 is a sectional view, similar to FIG. 2, but showing the collet in its open or retracted position, and with the dental bur removed;

FIG. 6 is a side elevational view of the collet of the handpiece of this invention;

FIG. 7 is an end elevational view of the collet of the handpiece of this invention;

FIG. 8 is an end elevational view of the collet of the handpiece of this invention, and is taken from the end opposite that shown in FIG. 7;

Figure 1:
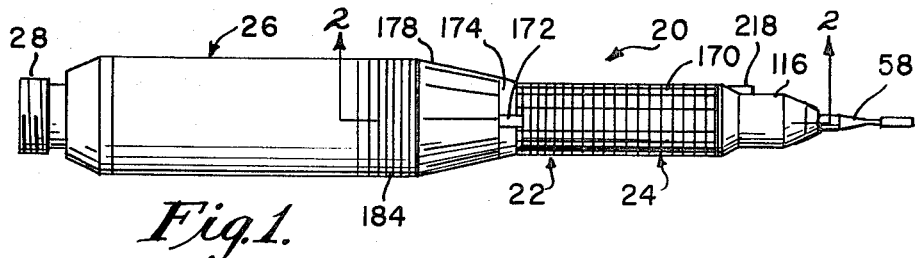
FIG. 1 is a side elevational view of the handpiece of this invention.

Referring now in greater detail to the various figures of the drawings wherein like reference characters refer to like parts, a dental handpiece embodying the present invention is generally shown at 20 in FIG. 1. Device 20 basically comprises a tubular housing 22 having a front section 24 and a rear section 26.

Rear section 26 comprises a housing for the motor or power section of the handpiece. It includes an adapter 28 at the rear thereof for connecting a source of power to the handpiece. Where the power for the handpiece is supplied by an air motor, the air tubes can be connected through adapter 28. An air motor that is utilizable with the handpiece of this invention can be that shown in U.S. Pat. No. 3,349,490. Other air driven power assemblies known to the art can also be used in this invention, as the specific mechanism for supplying the rotative power of the handpiece forms no part of this invention. Instead of having an air driven motor, an elongated electric motor can be mounted in housing section 26. In this case, a voltage source can be connected to adapter 28 for supplying the power to the electric motor.

Referring to FIG. 2, it is seen that mounted within the front section 24 of the housing 22, which is the chuck housing, is a collet shaft 30. Shaft 30 includes a shank 32 of enlarged diameter that is externally threaded. A collet shaft coupler 34 which is internally threaded, as shown at 36, is threadedly secured on shank 32. Coupler 34 includes a pair of threaded holes 38 in which are received setscrews 40. Coupler 34 includes a pair of diametrically opposed prongs 42, which are enmeshed with a pair of diametrically opposed prongs 44 on motor shaft coupler 46.

Motor shaft coupler 46 is secured on motor shaft 48. Motor shaft 48 is in turn journaled in ball bearings 50. The motor shaft 48 and ball bearings 50 are mounted in rear housing section 26. The motor shaft 48 supplies the rotative power for the handpiece, and can be the shaft of any electric motor or air driven motor known to the art.

The forward portion of the collet shaft 30 comprises a socket 52. Socket 52 has an outer wall 54 at its opening which tapers outwardly in going from the rear to the front of the socket. Mounted within socket 52 is a collet 56. A dental bur 58 (FIG. 1) is mounted in collet 56.

Collet 56 is shown in detail in FIGS. 6, 7 and 8. The collet is cut from a sleeve of resilient metal such as spring steel. The collet includes a rear end 60 and a forward end 62. Proceeding forwardly from rear end 60 is a first tapering outer surface 64. Tapering surface 64 terminates in a cylindrical section 66. A cylindrical boss 68 is formed on cylindrical section 66, and cylindrical section 66 continues after boss 68. A second boss 70 is formed at the end of cylindrical section 66. Boss 70 includes a tapering wall 72 which terminates at the end 62 of the collet. As seen in FIG. 5, collet 56 has an internal bore 74 of constant diameter.

Three equally spaced slots 76 proceed inwardly from end 60 of collet 56, and terminate short of boss 70. Likewise, three equally spaced slots 78 project inwardly from edge 62 and terminate short of tapered section 64. As seen in FIG. 6, slots 76 and 78 bypass each other. Slots 76 divide the rear section of the collet 56 into three jaws 80. Likewise, slots 78 divide the forward section of collet 56 into three jaws 82.

Referring again to FIG. 2, it is seen that telescoped over collet shaft coupler 34 is a hollow spindle 84. Spindle 84 includes a rear section 86 of reduced diameter on which is mounted a ball bearing 88. A boss 90 is formed on spindle 84, and includes a pair of holes in which are threadedly mounted setscrews 92. A spring stop ring 94 is telescoped over collet shaft 30 and is secured in place by set screws 92. A spacer ring 96 is positioned between ring 94 and the forward end of coupler 34.

Spindle 84 includes a second portion 98 of reduced diameter on which is mounted a ball bearing 100. Portion 98 is externally threaded at 102, and a collet nut 104 is threadedly secured thereon. Collet nut is hollow, and includes an inwardly tapering forward wall 106. As seen in FIG. 2, taper 106 of collet nut 104 is complementary to the tapering wall 72 of collet 56.

A compression spring 108 is telescoped over collet shaft 30. One end of spring 108 abuts stop ring 94. The other end of the spring abuts a shoulder 110 on shaft 30. The spring 108 urges the collet shaft 30 in the direction of collet 56.

A tubular frame 112 (FIG. 2) is telescoped over spindle 84. The front end 114 of frame 112 is internally threaded. A nose 116 is threadedly secured on frame 112 at 114. Nose 116 has a tapered forward end 118 with a central opening 120. Bur 58 is passed through opening 120 when it is secured in collet 56.

A forward bearing nut 122 is threadedly secured to frame 112 at forward end 114. Bearing nut 122 is urged against the outer race 124 of ball bearing 100. Thus, the bearing nut 122 will urge the ball bearing 100 against a shoulder 126 on spindle 84, thereby securing the ball bearing in place. A rear bearing nut 128 is threadedly secured in rear threads 130 in frame 112. Rear bearing nut 128 is urged against the outer race 132 of ball bearing 88. This, in turn, urges the ball bearing 88 against shoulder 134 on spindle 84, thereby securing the ball bearing and the spindle in place.

Figure 10:
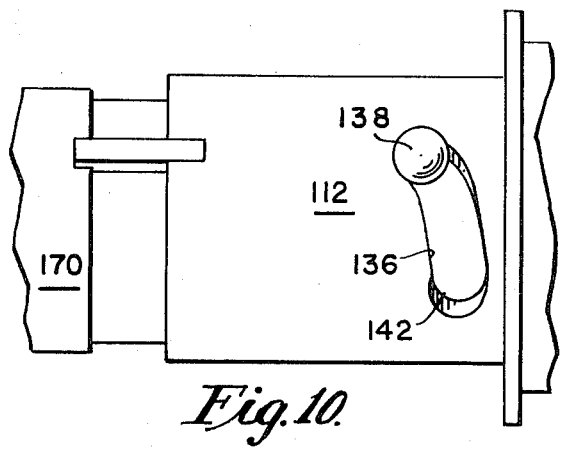
FIG. 10 is a sectional view taken along the line 10—10 of FIG. 9.
Figure 12:
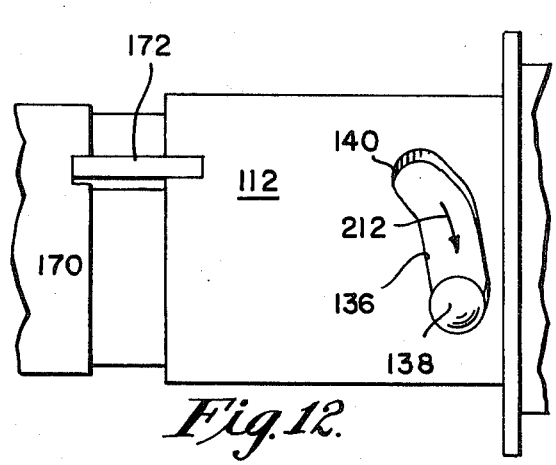
FIG. 12 is a sectional view taken along the line 12—12 of FIG. 11.

Frame 112 is provided with a pair of diametrically opposed slots 136. A ball 138 is positioned in each slot 136. As seen in FIG. 12, each slot 136 includes a forward angled terminus 140 which serves as a forward detent. As seen in FIG. 10, each slot 136 also includes a rear angled terminus 142 which serves as a rear detent. As will be explained hereinafter, each ball 138 is movable in slot 136 from front terminus 140 to rear terminus 142.

Frame 112 is provided with four holes 144 at the rear thereof (FIGS. 2, 3 and 4). As best seen in FIG. 4, each hole 144 is reduced in diameter in going from the outside to the inside of frame 112. A ball 146 is positioned in each hole 144. Balls 146 have portions thereof which pass through holes 144 and are received in a groove 148 in the forward portion of rear housing section 26. The inner diameter of each hole 144 is such as to permit a portion of each ball 146 to pass therethrough, but is sufficiently small to prevent the entire ball from passing therethrough.

A spring ring 150 is mounted in the bore of tubular frame 112, and is secured in place by a retainer ring 152 that is received within a groove 154 in frame 112. Retainer ring 152 is a split ring made of spring steel, and is snapped into groove 154 in a manner well known to the art. A compression spring 156 is secured within the bore of tubular frame 112, and has one end abutting spring ring 150 and the other end abutting a shoulder 158 of sleeve 160.

Figure 9:
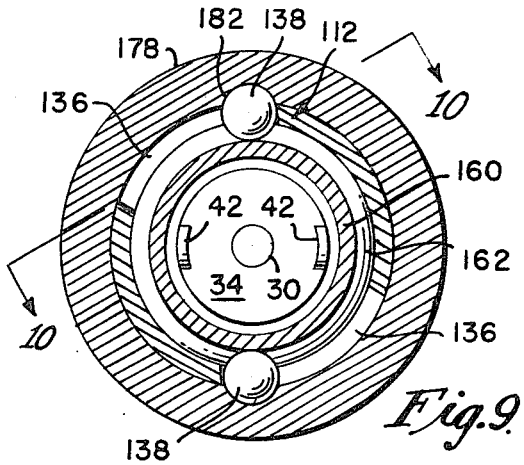
FIG. 9 is a sectional view taken along the line 9—9 of FIG. 2.
Figure 11:
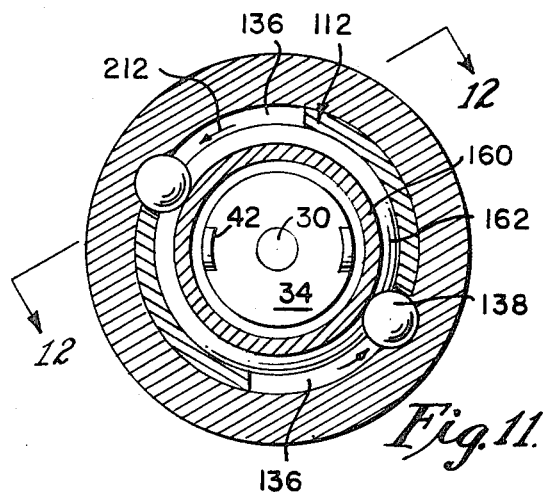
FIG. 11 is a sectional view taken along the line 11—11 of FIG. 5.

Sleeve 160 includes an annular outer groove 162 in which balls 138 are received (FIGS. 9 and 11). Sleeve 160 has a slot projecting inwardly from one end thereof, leaving a pair of arcuate legs 164 (one leg shown in FIG. 2). Each leg 164 includes an inwardly projecting lip 166. A central opening 168 is formed by lips 166, and connector 34 passes through opening 168.

A grip sleeve 170 is telescoped over tubular frame 112. As seen in FIG. 1, sleeve 170 is provided with longitudinally extending and circumferential grooves in order to facilitate the grasping of the sleeve when using the handpiece 20. Sleeve 170 is prevented from rotating relative to frame 112 by key 172 that is welded to the frame (see FIGS. 1 and 2). A retainer ring 174 encloses frame 112, with the ends of the retainer ring abutting key 172 (FIG. 1). As seen in FIG. 2, sleeve 170 is prevented from moving longitudinally relative to frame 112 by abutment of the ends of the sleeve against retainer ring 174 and shoulder 176 on nose 116.

A collet release sleeve 178 is rotatably mounted on frame 112. Release sleeve 178 is frustoconical in cross section, and includes longitudinally extending grooves (FIG. 1) to aid in grasping the release sleeve for rotation thereof. As seen in FIG. 2, one end of sleeve 178 abuts annular rim 180 on frame 112, and the other end of the sleeve abuts retainer ring 174. Sleeve 178 includes a pair of arcuate, diametrically opposed recesses 182 (FIGS. 2 and 9). Balls 138 are received in recesses 182.

A ball release sleeve 184 is rotatably mounted on frame 112 at the rear of the frame. The forward edge of the ball release sleeve 184 rests on annular rim 180 of frame 112. The rear edge of sleeve 184 abuts shoulder 186 formed on the rear housing section 26. A first circular bore 188 is formed in sleeve 184. A second circular bore 190 is formed in sleeve 184, and is in communication with bore 188. Bore 190 terminates in a rim 192. A coiled compression spring 194 is telescoped over frame 112. One end of spring 194 abuts rim 180 of the frame, and the other end abuts rim 192 of sleeve 184, thereby forcing the sleeve in the direction of rear housing section 26.

The handpiece 20 is shown in FIG. 2 in a condition that is ready for use. Thus, the front housing section 24, which comprises the chuck housing, is secured on the rear housing section 26, which comprises the power housing. When the air motor or electric motor in housing section 26 is actuated, through any of the means known to the art, the motor shaft 48 will be rotated. The rotational force is transferred to collet shaft 30 through prongs 44 and 42 of connectors 46 and 34, respectively. Thus, when connector 46 is rotated by motor shaft 48, the prongs 44 will come into engagement with prongs 42 (see also FIGS. 9 and 11) thereby rotating connector 34. Since connector 34 is threadedly secured on collet shaft 30, and further held in place through setscrews 40, the collet shaft will also be rotated. Likewise, with the rotation of the collet shaft, the spindle 84 and its associated collet nut 104 will be rotated. Rotation of the collet shaft, connector and spindle are facilitated through the use of ball bearings 88 and 100. The dental bur 58 which is held in collet 56, will in turn be rotated. The handpiece can then be used for any of its intended functions, such as the cleaning, scaling or drilling of teeth.

The front section 24 of the handpiece is secured on the rear section 26 by the engagement of balls 146 in groove 148 of the rear section 26. The balls 146 are maintained in the grooves by the force of the wall of bore 190 against the outer surface of the balls. Having the four equally spaced balls 146 (FIG. 3) insures that the front section 24 will be rigidly held on the rear section 26 during the use of the handpiece. Spring 194 urges sleeve 184 to the position shown in FIG. 2, thereby maintaining the balls 146 in groove 148, thus insuring that the forward section 24 will not be inadvertently removed from the rear section 26 during the use of the handpiece.

A review of FIG. 2 shows that nose 116, frame 112, sleeve 170, ring 174, collet release sleeve 178 and ball release sleeve 184 (see also FIG. 1) are rotatable relative to rear housing section 26. The rotation is permitted through the use of ball bearings 100 and 88, the engagement of balls 138 in groove 162 and the engagement of balls 146 in groove 148. By having the outer portions of front housing section 24 rotatable relative to rear housing section 26 facilitates the dentist's use of the handpiece. Thus, the dentist can easily change the angle of the handpiece when working on a patient's teeth without having to rotate his hand relative to the handpiece, since the outer portion of the handpiece which the dentist will be grasping will rotate as he changes the angular position of the handpiece. In the prior art handpieces wherein quick-disconnect systems were used, the chuck housing section was rigidly and nonrotatably mounted relative to the rear housing section. In this case, when the dentist wanted to change the angle of the handpiece in the patient's mouth, it was necessary for him to move his hand on the handpiece. Having the rotatable outer surface on the chuck housing will thus greatly facilitate the use of the handpiece.

When it is desired to disconnect front housing section 24 from rear housing section 26, sleeve 184 is pushed in the direction of arrows 196 (FIG. 4). This causes the compression of spring 194. Additionally, as the pressure against sleeve 184 is continued, internal shoulder 198 (FIGS. 2 and 4) of the sleeve will abut rim 180 of frame 112. Pressure of the shoulder 198 against the rim 180 will cause the section 24 to move longitudinally away from section 26, and thereby be disconnected from section 26. This is accomplished by the balls 138 being pushed upwardly by the tapered wall 200 (FIG. 4) of groove 148. Thus, the balls 138 will be moved outwardly in the direction of arrows 202 (FIG. 4) into the enlarged bore 188 of sleeve 184. With the balls 138 in the position shown in FIG. 4, they are completely removed from groove 148, and rear section 26 of the handpiece can be moved in the direction of arrow 204 out of contact with front section 24. The disconnecting process is easily accomplished by pressure on sleeve 184, and the dentist can carry out the process with one hand by using the thumb and forefinger to apply the necessary pressure on sleeve 184 and holding section 26 in the palm of his hand. After the front and rear housing sections have been separated, pressure on sleeve 184 is released, and balls 138 will be returned to the bottom of holes 144. The balls are retained in place by the wall of bore 190 and the fact that the bottom of the holes 144 are of a diameter which is smaller than the diameter of balls 138.

Figure 13:
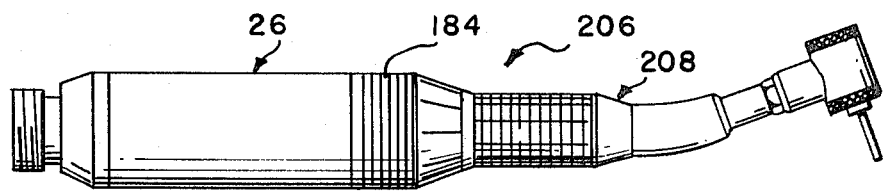
FIG. 13 is a side elevational view of a modified embodiment of the handpiece of this invention.

The main function of having the quick-disconnect assembly for the front and rear sections of the handpiece is to permit the substitution of a contraangle chuck arrangement for the straight chuck arrangement shown in FIG. 2. In FIG. 13, a modified embodiment of the handpiece of this invention is generally shown at 206. Embodiment 206 is similar in many respects to embodiment 20 in that it includes a rear section 26, which houses the motor assembly, and a front section 208. Rear section 26 is identical in all respects to the rear section 26 described with respect to embodiment 20. Front section 208 differs from the front section 24 in that the section 208 comprises a contraangle head rather than the straight head of embodiment 20. Thus, using the quick-disconnect assembly described above, the front section 208 can easily be substituted for front section 24 when the dentist desires to change from a straight head to a contraangle head in the work he is doing with his patients.

In order to secure front section 208 in place, sleeve 184 is slid forwardly to the position shown in FIG. 4. Thereafter, the rear of frame 112 is slid over the front of section 26 until section 112 abuts shoulder 186 of section 26. While the front section is being slid in place, the balls 138 are cammed outwardly by the sloping forward end 210 (FIG. 4) of rear section 26. When the balls 138 are positioned over groove 148, the upper balls will fall into the groove. When the pressure on the sleeve 184 is released, all of the balls will be forced in the groove 148, and the contraangle head will be secured on rear section 26 in the same manner as section 24 is secured, as shown in FIG. 2.

The contraangle head 208 is removed from rear section 26 in the same manner as section 24. Thus, sleeve 184 is pushed forwardly, and the two sections are pulled apart. Thereafter, the straight section 24 can be reconnected to the rear section 26. During the connecting of either of the front sections onto the rear sections, prongs 42 and 44 will be self-seating. Thus, since prongs 42 are freely rotatable on shaft 30, the prongs will be rotated out of alignment with prongs 44 should the four prongs abut when the front section is secured on the rear section. The quick-disconnect arrangement is utilizable not only for substituting one head section for another, but also for removing a head section for servicing or cleaning.

In FIG. 2, the shaft of dental bur 58 is shown as being secured in collet 56. A positive grasping action is placed on the shank of the bur by rear jaws 80 and front jaws 82 (FIG. 6). The rear jaws 80 are compressed on the shank of the bur by the force of tapering wall 54 of socket 52 on the rear tapering wall 64 of the collet. The front jaws 82 are compressed on the bur shank by the force of tapered wall 106 of collet nut 104 on the tapered wall 72 of the front of collet 56. The entire force of the walls on the collet is supplied by spring 108 which urges the collet shaft 30 toward the front of the handpiece. Thus, the spring will force the socket 52 of the collet shaft into engagement with the tear end of the collet 56. At the same time, this will push the collet into engagement with tapering wall 106 of collet nut 104, since the collet shaft 30 is slidable relative to spindle 84. However, the engagement of the collet with the spindle and the collet shaft under the force of spring 108 permits the rotation of the collet shaft, collet and spindle as a unit when the handpiece is actuated.

Whenever it is desired to insert or remove a dental bur from collet 56, the pressure of the spring 108 on the collet must be removed. This is accomplished by grasping sleeve 170 with one hand and rotating collet release sleeve 178 with the other hand (see FIG. 1). With the dental bur 58 in place, the sleeve 178 is in the position shown in FIGS. 9 and 10. However, when the sleeve is rotated, balls 138 will move in the direction of arrow 212 (FIGS. 11 and 12) from detent 140 in frame 112 to detent 142 in frame 112. It should be noted that sleeve 178 rotates about a fixed axis, and cannot move longitudinally. Thus, during the rotation of the sleeve, balls 138 will follow the path of slot 136 in frame 112 (FIGS. 9 to 12). The movement of the balls with respect to sleeve 178 is solely longitudinal along arcuate slot 182. Thus, the balls 138 will move from the forward position in the arcuate slot shown in FIG. 2 to the rear position in the arcuate slot shown in FIG. 5 when the sleeve is rotated.

As seen in FIGS. 9 and 11, the bottoms of balls 138 project through the bottoms of slots 136 into groove 162 of sleeve 160. Accordingly, as the balls move rearwardly in slots 136, they will move sleeve 170 linearly in the direction of arrows 214 (FIG. 5). This is caused by the abutment of the balls against the rear wall of groove 162. The movement of the sleeve is against the urging of spring 156. It is thus seen that slot 136 serves as a cam track, and is used for translating rotational movement of the sleeve 178 into longitudinal movement of the sleeve 160.

Continued movement of the sleeve 178 will force the sleeve 160 in the direction of arrows 214 until lip 166 of sleeve 160 abuts boss 216 of connector 34. Further movement of sleeve 178 will move connector 34 rearwardly, under the urging of lip 176, thereby sliding collet shaft 30, which is threadedly secured to connector 34, in the direction of arrow 218. As pointed out above, collet shaft 30 is slidable relative to spindle 84. As the collet shaft 30 is moved rearwardly, spring 108 will be compressed.

When the sleeve 178 has been rotated through its full extent, wherein balls 138 are in detents 142, collet shaft 30 will be withdrawn to the extent shown in FIG. 5. When the collet shaft is in this position, all pressure on collet 56 has been released, and the jaws 80 and 82 of the collet are expanded to the condition shown in FIG. 6. When the collet is in this condition, the dental bur can be removed, or if there is no bur in the handpiece, the dental bur can now be inserted in the collet.

When the dental bur 58 has been inserted, sleeve 178 is rotated in the opposite direction, thereby returning balls 138 to detents 140. This automatically returns sleeve 160 to return to the position shown in FIG. 2 under the urging of spring 156 and the movement of the balls 138 in slots 136. Likewise, collet shaft 30 will return to the position shown in FIG. 2 under the urging of spring 108. The lip 166 of sleeve 160 will no longer interfere with the return of the collet shaft, since the sleeve 160 has been returned to its position shown in FIG. 2. The forward movement of the collet shaft 30 will then securely grasp the collet within the socket 52 and the collet nut 104, thereby compressing the jaws of the collet onto the shank of the dental bur 58. The handpiece is now ready for use, in the manner described above.

Various adjustments can be made when assembling handpiece 20 to insure a proper hold on the collet 56 when a dental bur is inserted. Thus, the collet nut 104 can be adjusted by moving it longitudinally relative to spindle 84. The farther forward the collet nut 104 is moved, the lighter the grasp on the shank of the dental bur. Once the optimum position for the collet nut 104 has been determined, the collet nut can be adhesively secured in place at its threads.

Another adjustment on the pressure for the collet on the dental bur can be made at connector 34. Thus, the closer to the front of the handpiece the connector 34 is positioned, the lighter the grasp on the dental bur. Spacer 96 serves as a limit for the movement of the collet shaft 30 when no dental bur is inserted in the handpiece. The same spacer can be used for limiting the pressure on the dental bur. Accordingly, after the optimum position for the connector 34 is determined, the connector is secured in place through the use of setscrews 40. The position of the connector 34 also determines whether collet 56 will release the bur 58 when balls 138 are in detents 142. Thus there is no need for trial and error by the dentist when removing a bur, since he will know that the bur is removable when he has rotated balls 136 to the detents 142, which limit the rotational movement of sleeve 178.

Although this invention has been described with the use of a separate contraangle head to be substituted for the straight head 24, it is to be understood that the handpiece can also be utilized for the securement of a contraangle attachment on the nose 116, in a manner well known to the art. For this purpose a key 218 is welded on nose 116. The rotative power for the contraangle attachment is furnished by inserting a shank from the attachment into collet 56, and supplying power to handpiece 20 in the manner described above. One of the features of this invention is the fact that the collet 56 is tightened by forcing the collet forward in the handpiece. In prior art devices, the collet was withdrawn in order to tighten its jaws, and quite often this resulted in damage to the inserted shank of the contraangle attachment, and a binding of the attachment during use.

The handpiece of this invention can be made from any of the materials known to the art. Stainless steel is preferred. However, connector 46 on motor shaft 48 can be molded from nylon. Any of the attachments known to the art can be used in connection with the handpiece of this invention. Thus, a water spray can be added.

One of the features of having the sleeve 178 for opening and closing the collet jaws is that the control of the collet does not change the overall contour of the handpiece. Thus, there are no projecting knobs, rings or other protuberances on the handpiece to adjust the collet. The sleeve 178 and its associated structure enable the conversion of rotary motion into longitudinal motion for the control of the collet. Having the two detents 140 and 142 automatically sets the opening and closing positions for the collet, thereby facilitating the dentist's use of the handpiece. The dentist will not have to determine through trial and error when the collet is open and when the collet is sufficiently tight to grasp a dental bur, since the movement of the collet is automatically determined by the movement of the balls in the slots 136.

Without further elaboration, the foregoing will so fully illustrate my invention, that others may, by applying current or future knowledge, readily adapt the same for use under various conditions of service.

What is claimed as the invention is:

1. A dental handpiece comprising a housing, said housing including drive means, a rotatable hollow spindle connected to said drive means, said spindle having a tapering wall at one end thereof, a collet mounted within said spindle, said collet and said spindle being coaxial with respect to the longitudinal axis of said collet, said collet having a plurality of jaws, said jaws being tapered at one end thereof with the taper of said jaws complementing the taper of the end of said spindle, whereby abutment of said tapered surface of said jaws and said tapered wall of said spindle will depress said jaws, and means for moving said collet into abutment with said tapered wall, said moving means comprising rotatable means on said housing, said rotatable means being rotatable about said longitudinal axis, said rotatable means being longitudinally fixed on said housing, and said rotatable means actuating linearly moving means which are adapted to move said collet into abutment with said tapering wall when said rotatable means is rotated.

2. The dental handpiece of claim 1 wherein said linearly moving means comprises a collet shaft.

3. The dental handpiece of claim 2 wherein said collet shaft has a socket formed therein, with the other end of said collet being received in said socket.

4. The dental handpiece of claim 3 wherein said socket has a tapering wall and said other end of said collet is tapered and has a plurality of jaws formed therein, with said tapered wall of said socket and the taper of the other end of said collet being complementary, whereby linear movement of said collet shaft into said collet will depress the jaws on said other end of said collet and will move said one end of said collet into abutment with said tapered wall of said spindle.

5. The dental handpiece of claim 2 wherein said collet shaft is spring urged into abutment with said collet, thereby urging said collet into abutment with the wall of said spindle.

6. The dental handpiece of claim 2 and further including actuating means within said housing, said actuating means adapted to move said collet shaft linearly within said housing when said rotatable means is rotated.

7. The dental handpiece of claim 6 wherein said actuating means is mounted within said housing and is moved linearly by the rotation of said rotatable means, with the linear movement of said actuating means controlling the linear movement of said collet shaft.

8. The dental handpiece of claim 7 wherein said collet shaft is spring urged into abutment with said collet, said collet shaft having means protruding from the surface thereof, said protruding means adapted to be contacted by protruding means on said actuating means when said actuating means is moved in a direction away from said collet, whereby the abutment of said protruding means on said actuating means and the protruding means on said collet shaft moves said collet shaft away from said collet, thereby depressing the spring means urging said collet shaft, and whereby the movement of said actuating means out of contact with said protruding means on said collet shaft permits said collet shaft to contact said collet under the urging of said spring means.

9. The dental handpiece of claim 8 and further including second spring means urging said actuating means, whereby said second spring means will urge said protruding means on said actuating means out of abutment with said protruding means on said collet shaft.

10. The dental handpiece of claim 8 wherein said actuating means comprises a hollow tube that is concentrically mounted around said collet shaft, and said protruding means on said actuating means comprises an annular lip having a central opening, with said collet shaft being positioned in said opening.

11. The dental handpiece of claim 6 wherein said housing includes a frame with said rotatable means being mounted on said frame, said frame having a pair of slots being angled from the front toward the rear of said handpiece, said rotatable means comprising a sleeve having a pair of longitudinally extending recesses therein, a ball positioned in each of said recesses, with each of said balls being received in one of said slots in said frame, said balls projecting into a groove formed in said actuating means said actuating means being slidable relative to said frame, and said rotatable means being longitudinally immovable on said frame, whereby rotation of said rotatable means will move said balls in said slots, thereby sliding said actuating means by the engagement of said balls in said groove, and whereby said balls will move longitudinally in said recesses.

12. The dental handpiece of claim 11 wherein a detent is formed at each end of each of said slots, whereby said sleeve may be rotated from a first position with said balls in the first detent of each slot to a second position with said balls in the second detent of each slot.

13. The dental handpiece of claim 2 wherein said collet shaft and said spindle are rotatably mounted within said housing.

14. The dental handpiece of claim 13 wherein ball bearings mount said collet shaft and said spindle in said housing.

15. The dental handpiece of claim 1 wherein said housing includes a motor section and a chuck section, with said spindle being mounted in said chuck section, said chuck section being removably mounted on said motor section by quick-disconnect means, said chuck section including a frame, said quick-disconnect means comprising a plurality of balls mounted in a plurality of spaced holes in said frame with the inner portions of said holes having a diameter smaller than the diameters of said balls, said balls having portions thereof projecting through the inner portions of said holes, said motor section having an annular groove therein, with the projecting portions of said balls being received in said annular groove, and means for releasably maintaining said portions of said balls in said holes, thereby securing said chuck section on said motor section.

16. A dental handpiece comprising a housing, said housing having a motor section and a chuck section, means within said chuck section for rotatably securing a dental bur therein, and quick-disconnect means removably mounting said chuck section on said motor section, said quick-disconnect means comprising a plurality of balls mounted in a plurality of spaced holes in said frame with the inner portions of said holes having a diameter smaller than the diameters of said balls, said balls having portions thereof projecting through the inner portions of said holes, said motor section having an annular groove therein, with the projecting portions of said balls being received in said annual groove, and means for releasably maintaining said portions of said balls in said holes, thereby securing said chuck section on said motor section.

17. The dental handpiece of claim 16 wherein said motor section includes a motor shaft and said chuck section includes a collet shaft, said shafts being releasably rotatably connected.

18. The dental handpiece of claim 16 and further including a motor shaft in said motor section, connector means on said motor shaft, a collet shaft, each of said connector means including a pair of opposed prongs, said connector means being rotatable along with their respective motor shaft and collet shaft, with said prongs contacting each other during the rotation of said motor shaft.

19. The dental handpiece of claim 16 wherein said means for releasably maintaining said portions of said balls in said holes comprises a sleeve mounted on said frame.

20. The dental handpiece of claim 19 wherein said sleeve is rotatably mounted on said frame.

21. The handpiece of claim 19 wherein said sleeve is adapted to move axially along said housing, said sleeve having a first bore and a second bore in communication with said first bore, said first bore having a diameter larger than said second bore, said balls being maintained in said groove when said balls are in said second bore, and said balls being removable from said groove when in said first bore.

22. The dental handpiece of claim 21 and further including spring means urging said sleeve axially on said housing, said spring means adapted to place said balls in said second bore.

23. The dental handpiece of claim 22 wherein stop means are provided and one end of said sleeve will abut said stop means under the urging of said spring means.

24. The dental handpiece of claim 21 wherein said groove has an inclined wall, whereby said wall will aid in forcing said balls from said groove when said sleeve is axially moved to align said balls with said first bore and said motor section and said chuck section are pulled apart.

* * * * *

UNITED STATES PATENT OFFICE
CERTIFICATE OF CORRECTION

Patent No. 3,631,597    Dated January 4, 1972

Nathaniel H. Lieb
and
Franklin W. Kerfoot, Jr.

It is certified that errors appear in the above-identified patent and that said Letters Patent is hereby corrected as shown below:

(1) Column 6, line 45 "tear" should be --rear--.

(2) Claim 18, line 25 after the word "shaft" omit the comma (,) and add the following:

--in said chuck section, connecter means on said collet shaft,--.

Signed and sealed this 13th day of June 1972.

(SEAL)
Attest:

EDWARD M. FLETCHER, JR.
Attesting Officer

ROBERT GOTTSCHALK
Commissioner of Patents